Figure 1:
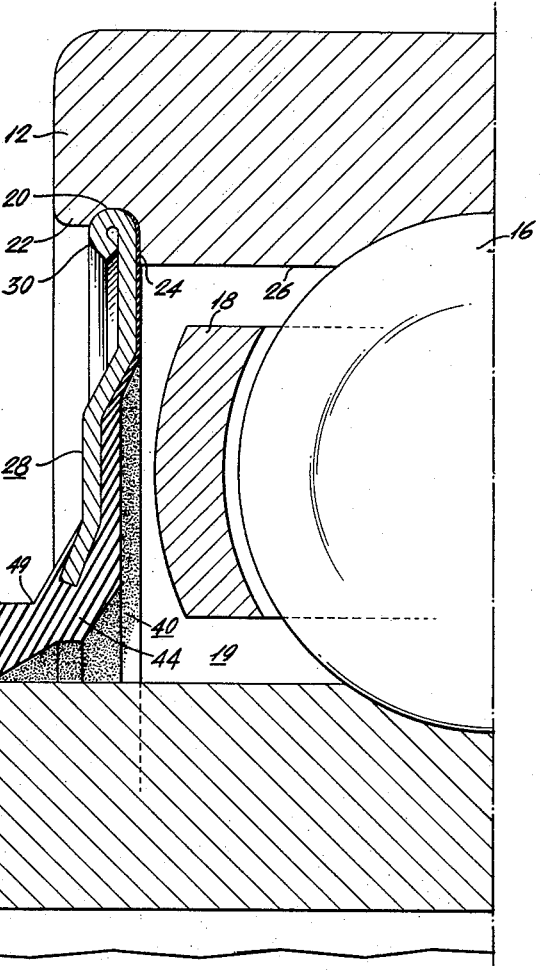

Aug. 25, 1964  N. J. NINOS ETAL  3,145,996

SEAL FOR BEARING

Filed March 6, 1962

INVENTORS:
NICHOLAS J. NINOS
JOHN C. LAWRENCE
JOHN L. BLAKE, JR.
BY Howson & Howson
ATTYS.

3,145,996
SEAL FOR BEARING
Nicholas J. Ninos, Philadelphia, Pa., John C. Lawrence, Chatsworth, Calif., and John L. Blake, Jr., Willow Grove, Pa., assignors to SKF Industries, Inc., Philadelphia, Pa., a corporation of Delaware
Filed Mar. 6, 1962, Ser. No. 177,840
4 Claims. (Cl. 277—169)

The present invention relates to a sealing device for sealing the interstice between spaced confronting surfaces of a pair of relatively rotatable members.

The seal of the present invention is particularly suitable for sealing the annular space between inner and outer race rings of a bearing assembly to prevent leakage of lubricant from the bearing and preclude infiltration of dirt and foreign matter into the annular space. Some prior bearing seals used for this purpose include a ring-like reinforcing member and a washer of a resilient material such as rubber secured to the reinforcing member having a lip portion of substantially uniform cross section projecting radially beyond the inner peripheral edge of the reinforcing member. The radial dimension of the seal is greater than the radial dimension of the annular space between the race rings so that when the seal is assembled in the annular space, the lip engages the inner race ring and is bent forwardly at an angle to the outer face of the seal.

These prior seals have not been entirely satisfactory in providing an effective seal especially in some bearing applications where liquids or fluids exert a comparatively high external pressure on the seal. In these applications, if the lip of the washer is not of sufficient cross section, the external pressures tend to displace the lip inwardly into the annular space thereby permitting entrance of dirt and foreign matter into the annular space and escape of lubricant therefrom which, of course, is undesirable.

Alternatively, if the cross section of the sealing lip is increased sufficiently to resist inward displacement, the force applied by the sealing lip on the inner race is of a magnitude to cause the seal to overheat and wear which ultimately results in premature failure of the seal.

In accordance with the present invention there is provided an improved bearing seal which overcomes the above noted difficulties of prior aforementioned seals. The seal of the present invention comprises a ring-like reinforcing member having an outer peripheral edge engageable for example in a groove in the outer race ring and an annular sealing element including a body portion secured to one face of the reinforcing member and a flange projecting axially and radially from the body portion at an angle thereto beyond the inner peripheral edge of the reinforcing member. The flange is adapted to engage the inner race ring and the juncture of the flange to the body portion is of reduced cross section to permit a small flexing movement of the flange when it engages the race ring.

Accordingly by reason of the angular disposition of the flange in its relaxed condition and the substantial cross section thereof, the seal resists displacement into the annular space of the bearing assembly or the like by comparatively high external pressures acting on the seal. Further the juncture of reduced cross section permits the deflection force exerted by the flange to be maintained at a desired minimum whereby wear of the seal is minimized and an effective sealing action is provided.

With the foregoing in mind, an object of the present invention is to provide a new and improved seal for a bearing assembly or the like which effectively seals the annular space between the inner and outer race rings under extreme operating conditions and wherein wear on the seal is a minimum thereby extending the life of the assembly considerably.

Another object of the present invention is to provide an improved seal for bearings which is of comparatively simplified construction and may be manufactured easily and economically.

Figure 2:
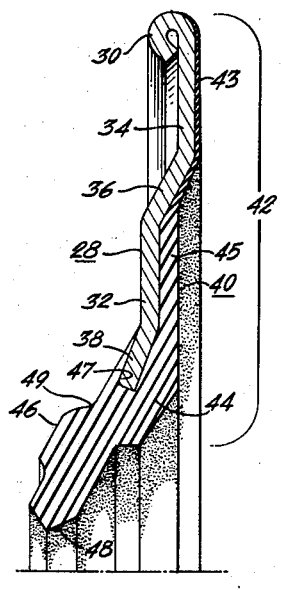

These and other objects of the present invention and the various features and details of the construction and use thereof are more fully set forth hereinafter with reference to the accompanying drawings in which:

FIG. 1 is a transverse fragmentary sectional view of a bearing assembly showing a seal in accordance with the present invention; and FIG. 2 is a fragmentary sectional view of the seal shown in FIG. 1 removed from the bearing assembly.

Referring now to the drawing, there is shown in FIG. 1 a bearing assembly comprising radially spaced inner and outer race rings 10 and 12 respectively having the usual raceways therein to support and guide a plurality of rolling bearing elements 16 and a cage 18 in the annular space 19 between the race rings. In the present instance the rolling elements are balls. FIG. 1 shows only one side of the bearing assembly, the opposite side thereof being an image of the shown side. Adjacent each axial end of the outer race ring 12, there is provided an annular locking groove 20 which is disposed between a radially inwardly projecting lip 22 and a radially extending shoulder 24. In the present instance the diameter of the opening provided by the lip 22 is smaller than the diameter of the groove 20 and greater than the inner peripheral wall 26 of the outer race ring.

In accordance with the present invention, a seal is provided which is detachably secured to the bearing assembly at either or both axial ends of the annular space 19 and which has novel features of construction and arrangement providing an effective seal between the race rings to retain lubricant in the bearing and prevent infiltration of dust and foreign matter into the annular space 19. To this end, the seal includes a ring-like reinforcing member 28 made for example of metal having an outer peripheral edge which is reversely bent on itself to provide a continuous peripheral bead 30. In the present instance, the reinforcing member 28 is of a stepped configuration comprising generally radially extending, axially offset inner and outer annular walls 32 and 34 respectively, a radially inwardly diverging frusto conical wall 36 connecting the inner and outer radial walls and a terminal lip 38 projecting forwardly from the inner wall section 32 at an angle to the outer face of the reinforcing member.

An annular sealing element 40 made of a resilient material such as rubber is bonded, by a suitable adhesive in the present instance, to the inner face of the reinforcing member 28. The sealing element comprises a body portion 42 conforming generally to the contour of the reinforcing member and a flange 46 projecting axially and radially from the body portion forwardly at an inclined angle of less than 90° to the inner radial wall 32. In the present instance the body portion 42 includes a web-like section 43 extending from the tip of the bead 30 coextensive with the outer wall 34, a central section 45 of increased cross section confronting the walls 32 and 36 of the reinforcing member and a marginal portion 44 projecting axially and radially from the central section 45. The marginal portion 44 is of a greater cross section than the central section and has a pocket 47 formed therein to receive and envelop the inclined lip 38. The flange 46 which is formed as an integral extension of the marginal portion 44 and projects in the same direction thereas is of substantially the same cross section as the marginal portion 44 and is offset therefrom to provide a juncture 49 of reduced cross section therebetween to permit flexing movement of the flange 46 with respect to the marginal portion 44 about the juncture 49. As illustrated the flange 46 is of a reduced cross section adjacent the tip thereof and has a chamfered inner peripheral edge as at 48.

The seal is assembled to the bearing by placing it over the annular recess between the race rings with the bead 30 engaging the lip 22 of the outer race ring. The stepped configuration of the reinforcing member 28 permits the same to be deformed slightly so that as the seal is urged inwardly, the bead 30 clears the lip 22 and seats in the annular groove 20. It is noted that the cross section of the bead 30 conforms to the cross section of the groove 20 to limit axial movement of the seal with respect to the outer race. In this position as illustrated in FIG. 1, the web-like section 43 abuts the radial shoulder 34 on the outer race ring and serves to compensate for surface irregularities and variations in the cross section in the annular groove 20 to provide a continuous surface-to-surface contact between the seal and the outer race ring thereby insuring an effective sealing action at this point. In this position as illustrated in FIG. 1, the flange 46 is flexed toward the exposed axial face of the seal at the juncture 49 of the flange 46 and marginal portion 44 whereby the chamfered edge 48 engages the inner race ring to provide a surface-to-surface contact therebetween. The tip of the flange 46 is flexible by reason of the reduced cross section thereof to permit the desired seating of the chamfered edge 48 to provide the surface-to-surface contact with the inner race ring 10. Further the substantial cross section of the flange 46 resists displacement inwardly for example, by externally acting pressures on the seal thereby insuring an effective seal during extreme operating conditions. Additionally by this construction the deflection force applied by the flange 46 to the inner race ring is maintained at a desired limit by reason of the flexibility of the flange thereby minimizing wear on the seal resulting from excessive deflection forces and insuring against an inefficient sealing action resulting from deflection forces that are too low.

From the foregoing it is apparent that the present invention provides an effective seal for bearings precluding infiltration of dirt and leakage of lubricant from the bearing during extreme operating conditions. Moreover the seal of the present invention is extremely economical to manufacture and has an exceptionally long endurance life.

While a particular embodiment of the present invention has been illustrated and described herein, it is not intended to limit the invention to such embodiment and changes and modifications may be made herein within the scope of the following claims.

We claim:
1. A seal for sealing the space between confronting surfaces of a pair of spaced relatively rotatable members comprising a ring-like reinforcing member, a sealing element including a body portion secured to said reinforcing member and a marginal portion projecting axially and radially with respect to said body portion at an angle thereto beyond a peripheral edge of said ring-like reinforcing member and a flange projecting from and in the same direction as said marginal portion, said marginal portion and flange being of substantially the same cross sectional thickness and being offset relative to one another to define a juncture therebetween of reduced cross section to permit flexing movement of said flange about said juncture.

2. A seal as claimed in claim 1 wherein said ring-like reinforcing member includes radially extending axially offset inner and outer walls and a terminal lip projecting axially and radially from said inner wall and including means defining a circumferentially extending pocket in said marginal portion receiving said terminal lip.

3. A seal for sealing the space between confronting surfaces of spaced inner and outer relatively rotatable members, the surface of said outer member having an annular groove therein, comprising a ring-like reinforcing member having an outer peripheral edge reversely bent on itself to provide a continuous bead engageable in said groove, an annular sealing element including a generally radially extending body portion secured to one face of said reinforcing member and coextensive therewith, a marginal portion projecting axially and radially with respect to said body portion at an angle thereto and a flange projecting axially and radially inwardly of said body portion at an angle thereto beyond the inner peripheral edge of said reinforcing member, said flange and marginal portion being of substantially the same cross sectional thickness and being offset relative to one another to define a juncture therebetween of reduced cross section to permit flexing movement of said flange about said juncture, the outer peripheral edge of said flange remote from said juncture being chamfered and adapted to engage the surface of said inner rotatable member in surface-to-surface contact therewith whereby said flange is flexed about said juncture toward said reinforcing member and thereby exerts a predetermined pressure on said surface.

4. The combination of a pair of radially spaced relatively rotatable members having confronting surfaces, means defining an annular groove in the confronting surface of one of said rotatable members adjacent an axial end thereof, sealing means for sealing the annular space between said rotatable members comprising a ring-like reinforcing member adapted to engage in said groove along one peripheral edge thereof, an annular sealing element including a body portion secured to said reinforcing member a marginal portion projecting axially and radially with respect to said body portion at an angle thereto and a flange projecting axially and radially from said body portion at an angle thereto beyond the other peripheral edge of said reinforcing member, said flange and marginal portion being of substantially the same cross sectional thickness and being offset relative to one another to define a juncture therebetween of reduced cross section to permit flexing movement of said flange about said juncture, said flange adapted to engage the surface of said other rotatable member whereby said flange is flexed about said juncture toward said reinforcing member thereby to seal the annular space between said rotatable members against infiltration of foreign matter.

References Cited in the file of this patent

UNITED STATES PATENTS

| | | |
|---|---|---|
| 3,032,346 | Sullivan | May 1, 1962 |
| 3,049,355 | Vernon | Aug. 14, 1962 |

FOREIGN PATENTS

| | | |
|---|---|---|
| 535,038 | Italy | Oct. 31, 1955 |
| 1,121,156, | France | Apr. 30, 1956 |